(12) United States Patent    (10) Patent No.: US 7,804,272 B2
Morita et al.               (45) Date of Patent: Sep. 28, 2010

(54) NON-CONTACT TYPE POWER FEEDER SYSTEM FOR MOBILE OBJECT AND PROTECTING APPARATUS THEREOF

(75) Inventors: Katsuaki Morita, Hiroshima-ken (JP); Masaya Mitake, Hiroshima-ken (JP); Masahiro Yamaguchi, Hiroshima-ken (JP); Masaomi Yamada, Hiroshima-ken (JP); Hiroshi Yamashita, Hiroshima-ken (JP); Kousuke Katahira, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 455 days.

(21) Appl. No.: 11/936,916

(22) Filed: Nov. 8, 2007

(65) Prior Publication Data
US 2008/0129246 A1   Jun. 5, 2008

(30) Foreign Application Priority Data
Nov. 10, 2006   (JP)   ............................. 2006-306052

(51) Int. Cl.
H01M 10/46 (2006.01)
(52) U.S. Cl. ..................................... 320/108
(58) Field of Classification Search ................. 320/107, 320/108, 109; 310/12.01, 12.02, 12.09; 104/282, 104/292; 290/16, 50
See application file for complete search history.

(56) References Cited
U.S. PATENT DOCUMENTS
7,495,414 B2 * 2/2009 Hui ............................ 320/108

FOREIGN PATENT DOCUMENTS

| JP | 2000150273 A | 5/2000 |
|---|---|---|
| JP | 2003115415 A | 4/2003 |
| JP | 2005224045 A | 8/2005 |
| JP | 2006128397 A | 5/2006 |

* cited by examiner

Primary Examiner—Edward Tso
(74) Attorney, Agent, or Firm—Lowe Haupman Ham & Berner LLP

(57) ABSTRACT

A noncontact type power feeder system for feeding a power to a mobile object, in which a power feeding portion and a power receiving portion can be easily manufactured at low costs and which can transmit a high power. The noncontact type power feeder system for a mobile object, comprises a power feeding portion provided in a surface on which the mobile object runs, and a power receiving portion provided in the lower part of the mobile object at a position facing to the power supply portion, the each of the power feeding portion and the power receiving portion is composed of windings formed in an oval shape, and a magnetic planar core formed therein with a recess in which the windings are accommodated so that the longitudinal direction of the oval shape of the windings is extended along the travel direction of the mobile object, the planer core is composed of several planar blocks each having a rectangular surface, several blocks being laid so that long sides of the rectangular surfaces are extended in the travel direction of the mobile object, in which several blocks are also laid in the direction orthogonal to the travel direction, and several blocks being superposed one upon another, the recess of the planar core is defined by thick wall parts in which the planar cores are superposed on the surface of the planar core, outside and inside of the oval shape part of the windings.

9 Claims, 12 Drawing Sheets

NON-CONTACT TYPE POWER FEEDER SYSTEM FOR MOBILE OBJECT AND PROTECTING APPARATUS THEREOF

RELATED APPLICATIONS

The present application is based on, and claims priority from, Japanese Application Number 2006-306052, filed Nov. 10, 2006, the disclosure of which is hereby incorporated by reference herein in its entirety.

BACKGROUND OF THE INVENTION

1. Field of the Invention

A present invention relates to a power feeder system for feeding a power to a power receiving portion provided to a mobile object such as an electric vehicle in a track way type transportation system or an electric mobile, from a power feeding portion provided in a track way, a road surface or the like on which the mobile object runs.

2. Description of the Related Art

A noncontact type power feeder system is adapted to feed a power in a noncontact manner from a power feeding portion to a power receiving portion which are opposed face-to-face to each other through a gap therebetween, with the use of electromagnetic induction. The power feeding portion and the power receiving portion are provided therein with cores made of magnetic material such as ferrite. An E-shape core as an example thereof, has a plurality of protrusions and a plurality of recesses which are defined between the adjacent protrusions, and windings annularly runs around among the plurality of recesses.

Patent Document 1 (Japanese Patent Laid-Open No. 2006-128397) discloses a power feeder system for feeding a power in a noncontact manner to a shopping cart or the like. E-type cores made of ferrite are used in a power feeding portion and a power receiving portion in this power feeder system, and windings are arranged at levels equal to the heights of protrusions of the cores in both power feeding and receiving portions so as to minimize the inter distance between the windings in the power feeding portion and the windings in the power receiving portion in order to reduce leakage flux from the power feeding portion and as well to enhance the transmission efficiency from the windings on the power feeding portion side to the windings on the power receiving portion side.

Patent Document 2 (Japanese Patent Laid-Open No. 2000-150273) discloses a transformer for a noncontact type power feeder system having annular cores in a power feeding portion and a power receiving portion in order to enable transmission of a high power. The annular cores which are made of ferrite are formed in either a process in which a plurality of sector-like blocks are coupled to one another so as to form a single disc-like shape or a process in which several unit blocks having a U-like transverse sectional shape are stacked one upon another and coupled to one another so as to form a disc-like shape.

The noncontact type power feeder system disclosed in patent document 1 is adapted to be used for a relatively low power transmission for a display unit in the shopping cart or the like, but is not intended for transmission of a high power of not lower than about several ten kW. The gap between the power feeding portion and the power receiving portion is regulated so as to maintain a small value, that is, about 2 mm in order to increase its magnetic coupling rate (a ratio of an effective magnetic flux with respect to an overall magnetic flux). Should the gap be deviated within an about one millimeter, the inductance thereof would vary largely so as to be largely out of a resonance condition, and accordingly, No higher power can be transmitted effectively. Thus, this power feeder system cannot transmit a large power in this configuration as it is.

The transformer for noncontact type power feeder system, disclosed in cited reference 2, is capable of transmitting a relatively high power, having an annular core formed of sector-like blocks which are jointed to one another. However, it is difficult to form blocks having the sector-like shape, and accordingly, there is caused a problem of taking much time and labor for the manufacture thereof. Further, the core having a disc-like shape, and composed of several unit blocks having a U-like transverse-sectional shape, which are stacked one upon another and jointed to one another, causes much time and labor for manufacturing several unit blocks, and further, there is a risk of presence of gaps between adjacent unit blocks arranged in an arcuate shape, resulting in an problem of reducing a transmittable power per unit area caused by lowering of inductance due to a decrease in an area occupied by the core.

Further, since the shape of the core is annular, the winding width of the windings cannot be taken largely, resulting in decrease in magnetic coupling rate, and a large radius is required for transmission of a high power, and accordingly, there is caused a problem of lowering design flexibility.

SUMMARY OF THE INVENTION

Thus, the present invention is devised in view of the above-mentioned background, and accordingly, an object of the present invention is to provide a noncontact type power feeder system for feeding a power to a mobile object, which can facilitate the manufacture of a power feeding portion and a power receiving portion at low costs, and which can enhance the magnetic coupling rate.

Further, another object of the present invention is to provide a noncontact type power feeder system which can increase an inductance so as to be capable of transmitting a high power.

To the end, according to the present invention, there is provided a noncontact type power feeder system for a mobile object, composed of a power feeding portion provided along a track way for the mobile object, and a power receiving portion provided in the mobile object, the power feeding portion and the power receiving portion being opposed face-to-face to each other so as to carry out power feed, wherein each of the power feeding portion and the power receiving portion is composed of windings formed in an oval shape, and a magnetic planar core having a surface formed therein with a recess in which the windings are accommodated, wherein the planar core is formed of an assembly of planar blocks each having a rectangular surface, the assembly of planar blocks having thin wall parts in which planar blocks are laid in one and the same plane with their long sides are adjacent to one another, and thick wall parts in which planar blocks are superposed one upon another, the recess of the planar core is defined by the thick wall parts in which planar blocks are superposed on the surface of the planar core on the inside and the outside of the oval shape of the windings, and the longitudinal direction of the oval shape of windings and the long sides of the planar blocks are directed in a travel direction of the mobile object when the power feeding portion and the power receiving portion are opposed face-to-face to each other.

In the present invention, both power feeding portion and power receiving portion substantially have one and the same configuration. The power feeding portion is provided along the track way while the power receiving portion is provided in the mobile object, and when the mobile object comes to a stop in a power feeding place, the power receiving portion and the power receiving portion are arranged so that their winding laying surfaces are opposed faced-to-face to each other with a predetermined gap therebetween in order to feed a power to the mobile object.

When an a.c. current is fed to a primary winding of the power feeding portion in such a condition that the power feeding portion and the power receiving portion are opposed to face-to-face each other, a magnetic flux is generated with a main magnetic path which extends through the power feeding portion, the power receiving portion and the gap between the power feeding portion and the power receiving portion.

An overall magnetic flux is the sum of an effective magnetic flux interlinking a secondary winding of the power receiving portion, and a leakage magnetic flux which does not interlink the secondary winding. Since the magnetic flux interlinking the secondary winding changes with time, an induced electric motive force is produced in the secondary winding due to electromagnetic induction, and accordingly, an a.c. current runs so that a power is transmitted to a load connected to the secondary winding.

In the present invention, the planar core which constitutes the power feeding portion or the power receiving portion is formed of an assembly of planer blocks each having a rectangular surface, the assembly of planar blocks being composed of thin wall parts in which planar blocks are arranged in one and the same plane with their long sides being made into contact with one another, and thick wall parts in which planar blocks are superposed one upon another, the recess in the planar core being defined by the thick wall parts in which the planar blocks are superposed on the surface of the planar core on the inside and the outside of the oval part of the windings, and when the power feeding portion and the power receiving portion are opposed face-to-face to each other, the longitudinal direction of the oval part of the windings and the long sides of the planar blocks are directed in the travel direction of the mobile object.

Thus, the surface of the planar core can be formed in a rectangular shape, having its long sides extending in the travel direction with no difficulty. Further, by changing the arrangement of the planar blocks, the shape of the core may easily be changed into a desired shape. Further, with the combination of the above-mentioned planar blocks, a planer core having a simple shape can be manufactured at lower costs.

The windings are accommodated in the recess formed in the surface of the planar core. Further, the planar blocks may be joined to one another with the use of adhesives and screws. Further, in such a case that the power feeding portion is provided in the surface of the track way while the power receiving portion is provided in the mobile object, the power feeding portion and the power receiving portion are accommodated respectively in protecting apparatuses serving as means for protecting the power feeding portion and the power receiving portion from the external environment. The protecting apparatus will be described later.

In the power feeder system according to the present invention, the power feeding portion or the power receiving portion may be secured to the surface of the track way for the mobile object, or the mobile object, or it may be attached to the surface of the track way or the mobile object so as to be movable, relative to the surface of the track way or the mobile object. Even in either of these cases, when the power feeding portion and the power receiving portion are opposed face-to-face to each other, the longitudinal direction of the oval shape of the windings and the long sides of the planar blocks are directed in the travel direction of the mobile object. Accordingly, a large-size planar core having long sides in the travel direction can be easily formed, and accordingly, a noncontact type power feeder system composes of the above-mentioned planer core, can ensure an excellent design flexibility with respect to the transmission of a high power by decreasing the overall width of the planar core as possible as it can, and by adjusting the length thereof in the travel direction of the mobile object.

In the present invention as stated above, a large size core can be easily manufactured, and accordingly, the gap between the power feeding portion and the power receiving portion can become larger, that is, the gap can be set to a value, for example, in a range from about several millimeters to several ten millimeters.

In the present invention, preferably, with the provision of U-like cross-sectional shape parts for supporting opposite ends of the windings in the longitudinal direction of the oval shape thereof, to the planar core, the windings may be supported by the planar core over the entire periphery thereof. In this configuration, by arranging the core having a U-like cross-section in the magnetic path in the form of an air space, the overall magnetic resistance becomes lower while the inductance becomes higher. Thus, the magnetic flux density on the inside of the windings becomes larger. Further, the sectional area of the planer core located outside of the recess in which the windings are accommodated, can be larger, and accordingly, the density of magnetic flux outside the windings can be set to be smaller. Thus, the density of magnetic flux leaking at the periphery of the core can be less, thereby it is possible to reduce affection by magnetic noise and induction heating through a metal around the windings. Further, since the U-like sectional shape parts are present at both ends of the planar core in the longitudinal direction of the oval shape of the windings, the magnetic flux can be easily produced, thereby it is possible to have a higher inductance and to transmit a higher power.

Further, according to the present invention, if the opening width of the recess in which the windings are accommodated is set to be equal to or larger than the gap between the power feeding portion and the power receiving portion, the magnetic resistance of the magnetic path through which leakage magnetic flux produces, can be set to be higher, thereby it is possible to enhance the magnetic coupling rate and therefore to transmit a higher power.

Moreover, according to the present invention, by setting the length of the power feeding portion along the travel direction of the mobile object, to be longer than the power receiving portion along the travel direction, the robustness for the power receiving capacity can be enhanced, with respect to a positional deviation of the stopping position of the mobile object in a horizontal direction. Further, it is not required to make longer the planar core in the power receiving portion which is installed on the mobile object side and for which robustness, lightweight and compactness are required, that is, by setting the planar core to be sorter, the lightweight and the compactness can be achieved.

It is noted, according to the present invention, that by feeding a high frequency current of about several KHz to several ten KHz to the power feeding portion, the sectional area of the core can be set to be small in comparison with another core to which an equal power is fed, and accordingly, it is possible to miniaturize the system since the inductive electromotive force is proportional to a frequency. Moreover, it is preferable to use, for the windings, litz wires which can restrain an increase in resistance and an increase in heating caused by a skin effect. Further, as a magnetic material from which the planar core is made, there may be used ferromagnetic ferrite, silicate steel sheet or the like. Although the silicate steel sheet has a larger loss in comparison with the ferrite, it can be used in a relatively low frequency band. It is noted that an iron core produces eddy currents which generate a heat, and accordingly, is inconvenient.

Further, in the present invention, by arranging the above-mentioned thick wall parts and the thin wall parts alternately in the travel direction of the mobile object, the thick wall parts and the thin wall parts can be located with point symmetry with respect to the center point of the planer core. With this configuration, even though the planar core is set to be longer in the travel direction of the mobile object, the lightweight and cost reduction can be attained, and accordingly, the fabrication of the planar core can be facilitated. Moreover, since it can be longer in the travel direction of the mobile object, a higher power can be transmitted. Thus, the gap between the power feeding portion and the power receiving portion can be set to be larger, and accordingly, even though a large deviation in the horizontal direction is caused between the power feeding portion and the power receiving portion when the mobile object comes to a stop, the inductance does not largely vary, thereby it is possible to transmit a higher power.

Further, if it is not necessary to transmit a relatively high power, the planar core may be divided into pieces arranged along the travel direction of the mobile object with air gap parts being defined between the pieces, and these pieces may be formed of the air gap parts, excepts recesses, the thick wall parts and the thin wall parts being arranged with point symmetry with respect to the center point of the planar core. With this configuration, the lightweight and cost reduction can be further enhanced.

Further, according to the present invention, there is provided a protecting apparatus for accommodating and protecting the power feeding portion or the power receiving portion which have the above-mentioned configuration, including a protecting cover having an internal accommodation space is attached to a base board which is mounted to a mobile object, or provided in the vicinity of a track way for the mobile object, and the power feeding portion or the power receiving portion is accommodated in the internal accommodation space with a planar insulating member is interposed itself and the base board.

The protecting apparatus according to the present invention, can prevent the power feeding portion or the power receiving portion from being deteriorated by external environments such as dust and rain water in the case of attaching the power feeding portion on the road surface on which the mobile object runs, or attaching the power receiving portion to the lower part of the mobile object or the like. Further, since the power feeding portion or the power receiving portion is covered with the protecting cover, it is possible to protect the power feeding portion or the power receiving portion from an external force applied thereto.

With the protecting apparatus according to the present invention, in addition to the above-mentioned configuration, an air gap part is formed in the center part of the planar core, and a spacer is provided in the air gap part so as to fill the space between the planar insulation member and the protecting cover, thereby it is possible to allow the spacer to remarkably enhance the strength of the protecting cover, and therefore to safely protect the power feeding portion or the power receiving portion from an external force exerted thereto.

DETAILED DESCRIPTION OF THE PREFERRED EMBODIMENTS

Exemplified explanation will be hereinbelow made of preferred embodiments of the present invention with reference to the accompanying drawings. It is not intended to limit the scope of the present invention to the dimensions, materials, shapes, relative arrangements and the like of components which will be described in these embodiments unless otherwise specified.

Embodiment 1

Figure 1:
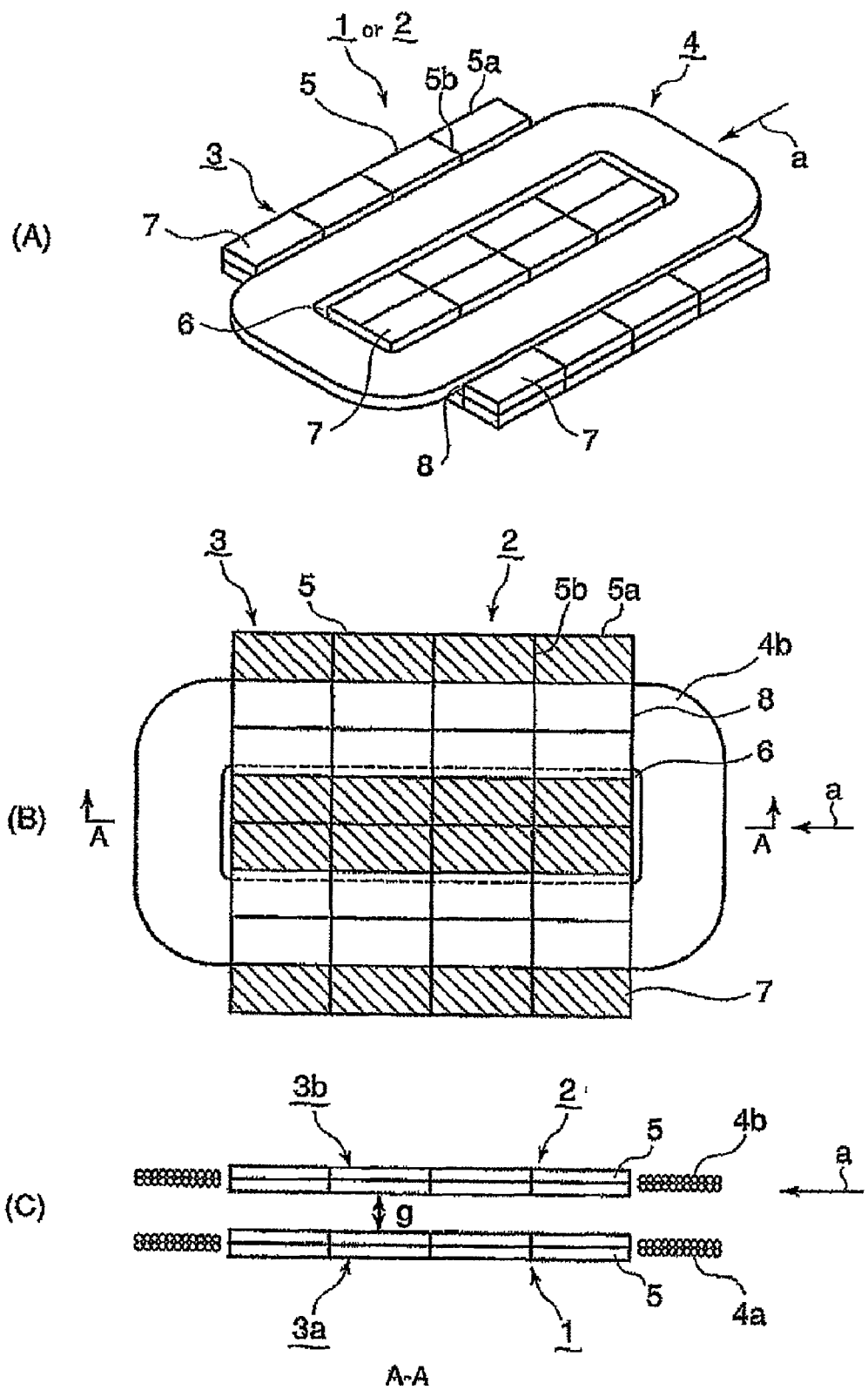
FIG. 1A is a perspective view illustrating a power feeding portion or a power receiving portion of a noncontact type power feeder system in a first embodiment of the present invention.
FIG. 1B is a plan view illustrating the noncontact type power feeder system in which the power feeding portion and the power receiving portion are opposed face-to-face to each other.
FIG. 1C is a sectional view along line A-A in FIG. 1A.

A first embodiment of the present invention will be explained with reference to FIGS. 1A to 1C in which FIG. 1A is a perspective view illustrating a power feeding portion or a power receiving portion of a noncontact type power feeder system to which the present invention is applied, FIG. 1B is a plan view illustrating the noncontact type power feeder system in which the power receiving portion and the power feeding portion are opposed face-to-face to each other, and FIG. 1C is a sectional view along line A-A in FIG. 1B. Reference to FIGS. 1A to 1C, the power feeding portion 1 or the power receiving portion 2 is composed of an E-type core 3 and the windings 4. The E-type core 3 is composed of several planar blocks 5 made of ferromagnetic ferrite, which are appropriately laid in a travel direction (a) of a mobile object and a direction orthogonal to the travel direction (a), and which are stacked one upon another while the adjacent planar blocks 5 are joined to one another by means of an adhesive or screws. Specifically, the power feeding portion 1 or the power receiving portion 2 in this embodiment is composed of 48 of the planar blocks 5 which are conveniently available at low costs as standards.

Each of the planar block 5 has a planar member having a rectangular surface, and all planar blocks are arranged with their long sides being directed in the travel direction (a) and their short sides in a direction orthogonal to the travel direction (a). Thus, the power feeding portion 1 or the power receiving portion 2 is appropriate for the manufacture of a planar body having a rectangular surface, the long sides thereof being laid along the travel direction (a). It is noted that the shaded portions in FIG. 1B show parts where two planar blocks 2 are superposed one upon another so as to form protrusions (thick wall parts) 7.

The windings are formed in an oval shape, and is set in a recess (8) defined between the protrusions (shaded portions) 7 of the E-type core 3, the longitudinal direction of the oval shape being directed in the travel direction (a). Clearances 6 are provided for forming curvature radii of the windings 4 at corners of the planer blocks 5.

The above-mentioned power feeding portion 1 and the power receiving portion 2 are opposed face-to-face to each other with a gap g being defined therebetween. The power receiving portion 2 is mounted in a mobile vehicle having a storage cell unit, such as a new transportation system vehicle, an electric car, a tramcar, an electric car, a golf cart or the like. Meanwhile the power feeding portion 1 is embedded in, for example, a track way for the mobile object or a floor surface of a garage, a repair firm or the like. The power receiving portion 2 is attached in the lower part of the mobile object at a position where the power receiving portion 2 is opposed to the power feeding portion 1 in parallel to each other with the gap g therebetween when the mobile object comes to a position right above the power feeding portion 1 in the travel direction (a) thereof.

When the mobile object comes to a stop at the position where the power receiving portion 2 is opposed face-to-face to the power feeding portion 2 for charging, an a.c. current is fed to a primary winding 4a in the power feeding portion 1 so as to produce a magnetic flux having a main magnetic path which extends through a primary core 3a of the power feeding portion 1, a secondary core 3b in the power receiving portion 2, and the gap g. With the use of a high frequency current having about several KHz to several ten KHz as the a.c. current, the sectional area of the core for transmission of one and the same power can be made to be small since an inductive voltage is proportional to a frequency, thereby it is possible to miniaturize the core. The total magnetic flux is the sum of an effective magnetic flux interlinking the secondary winding 4b in the power receiving portion 2 and a leakage magnetic flux which does not interlink the secondary winding 4b. Since the effective magnetic flux interlinking the secondary winding 4b varies with time, an inductive magnetic motive force is produced in the secondary winding 4b due to magnetic induction, and accordingly, an a.c. current runs therethrough so that a power is transmitted to a load coupled to the secondary winding 4b.

According to the present embodiment, with the combination of several planar blocks 5, there can be conveniently formed the E type core 3 having a large size at low costs. The planar blocks 5 are laid, the long sides 5a being extended in the travel direction (a) while the longitudinal direction of the oval shape of the windings is directed in the travel direction, and accordingly, the E-type core 3 can be formed to be longer in the traveling direction (a), and accordingly, the width thereof in the direction orthogonal to the travel direction (a) can be instead narrower, thereby it is possible to enhance the flexibility of the arrangement of equipments and dimensional design.

Since a large size core can be easily formed, a high power can be transmitted even though the gap g between the power feeding portion 1 and the power receiving portion is set to be larger. Further, since the gap g can be set to be larger, a high power can be also transmitted even though a position where the mobile object comes to a stop is horizontally deviated from the power feeding portion 2. Further, on the contrary, even if the gap g varies more or less, the inductance does not change greatly, and accordingly, the high power can be also transmitted.

Embodiment 2

Figure 2:
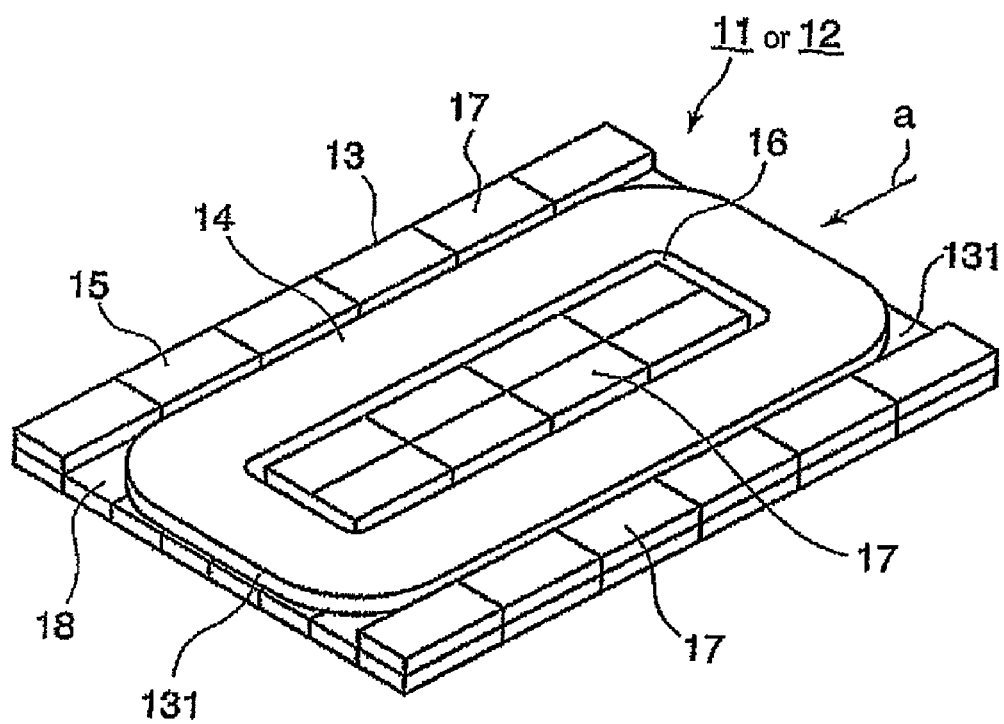
FIG. 2 is a perspective view illustrating a power feeding portion or a power receiving portion in a second embodiment of the present invention.
Figure 3:
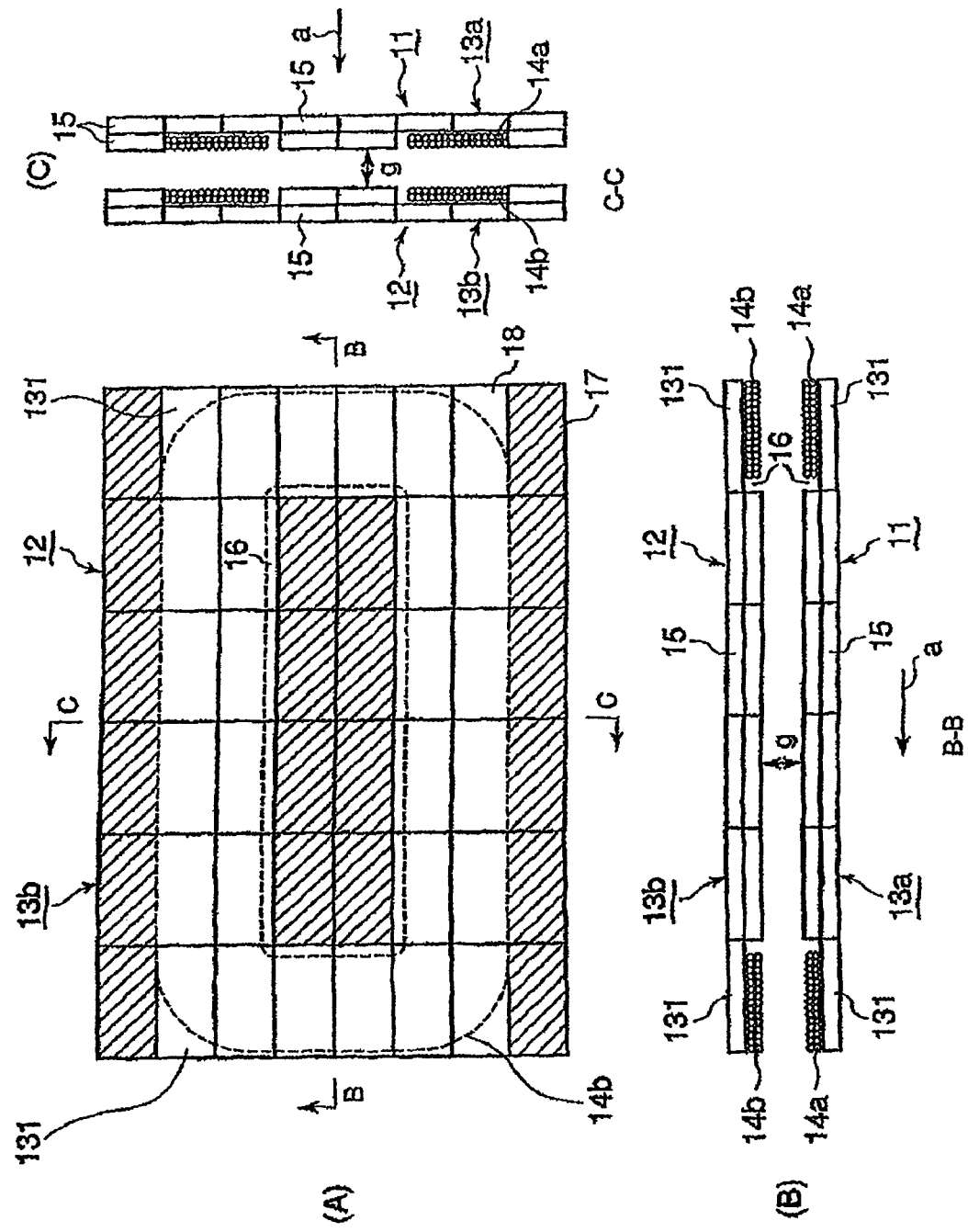
FIG. 3A is a plan view illustrating a noncontact type power feeder system in the second embodiment of the present invention.
FIG. 3B is a sectional view along line B-B in FIG. 3A.
FIG. 3C is a sectional view along line C-C in FIG. 3A.
Figure 4:
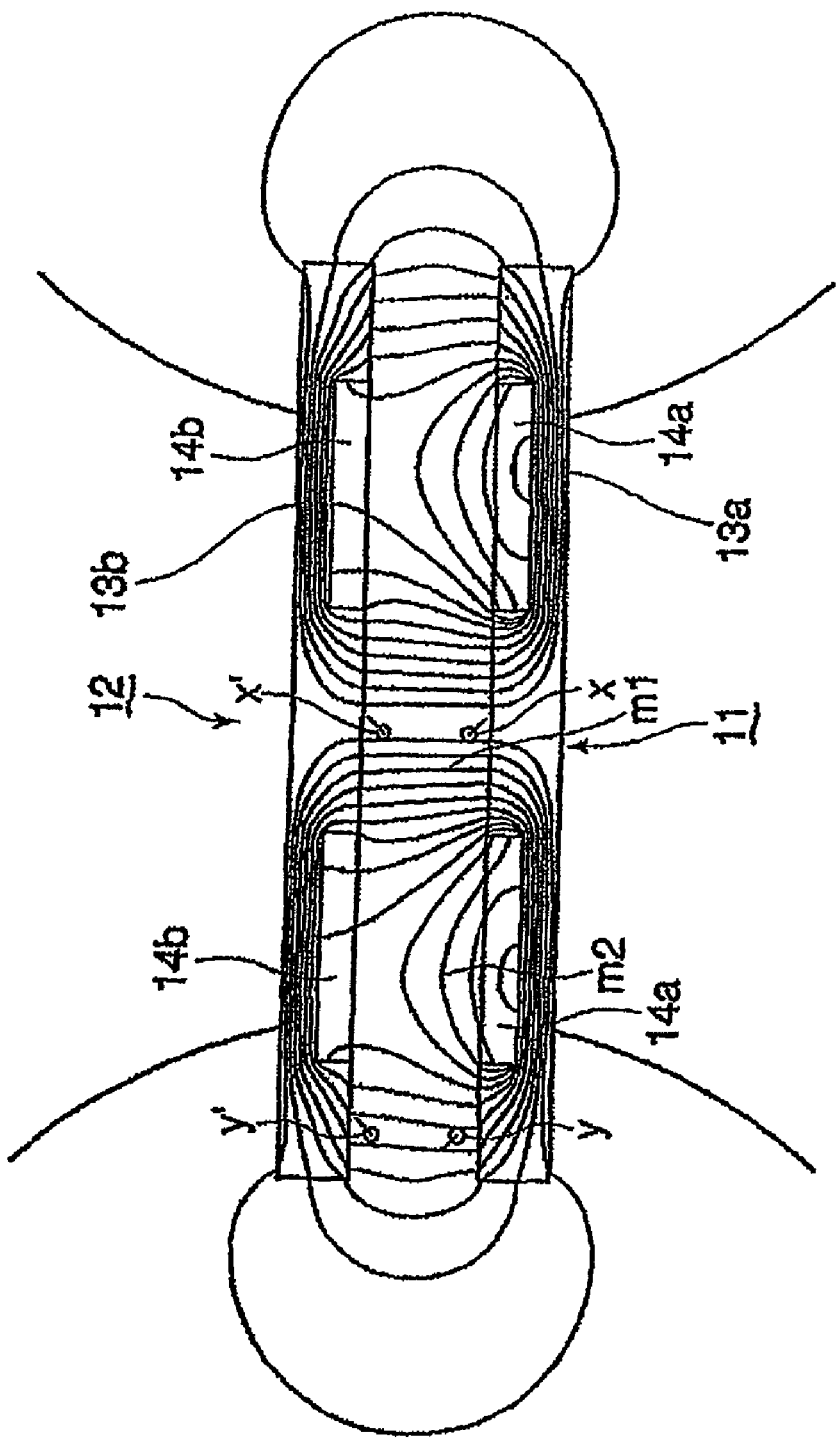
FIG. 4 is a chart which show a magnetic induction lines produced in the noncontact type power feeder system in the second embodiment.
Figure 5:
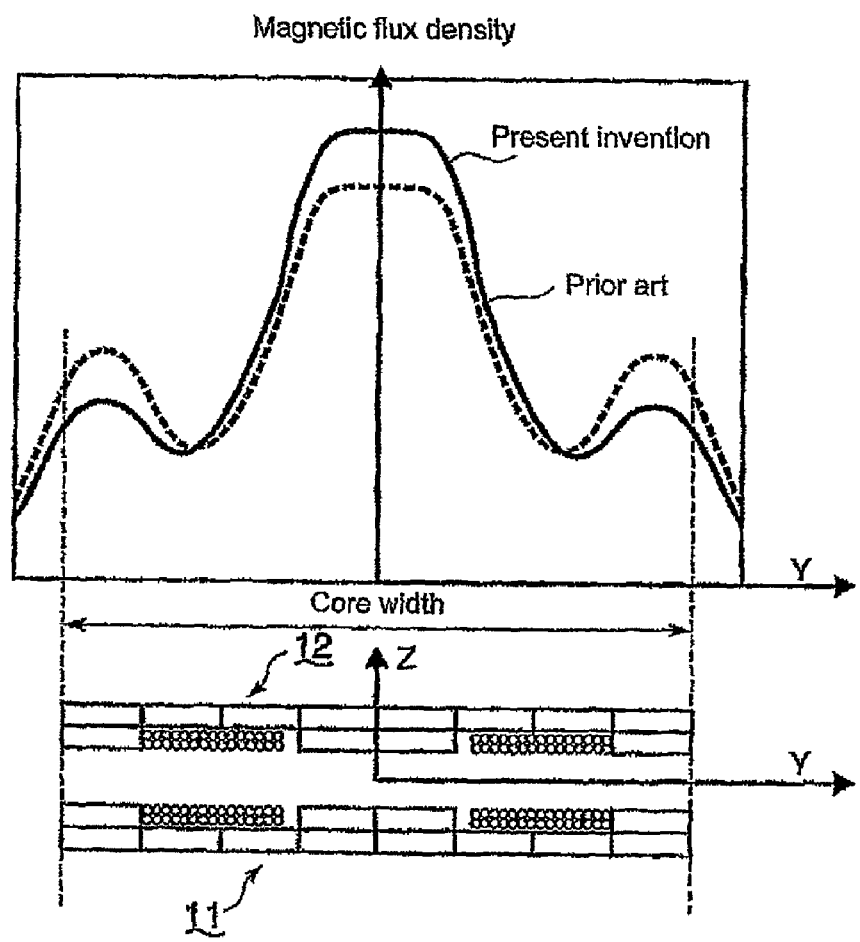
FIG. 5 is a chart which shows magnetic flux density distributions in a core width direction in the second embodiment and the prior art.
Figure 6:
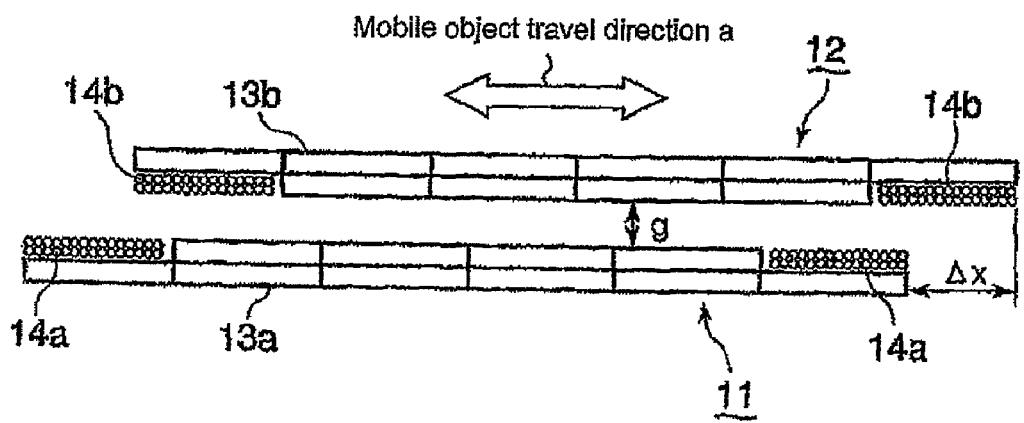
FIG. 6 is a view for explaining a horizontally positional deviation of a mobile object in the second embodiment of the present invention.

Next, explanation will be hereinbelow made of a second embodiment of the present invention with reference to FIGS. 2 to 6 in which FIG. 2 is a perspective view illustrating a power feeding portion or a power receiving portion, FIG. 3A is a plan view illustrating a noncontact type power feeder system in the second embodiment, the power feeding portion being opposed face-to-face to the power receiving portion, FIG. 3B is a sectional view along line B-B in FIG. 3A, FIG. 3C is a sectional view along line C-C in FIG. 3A, FIG. 4 is a chart showing magnetic flux lines applied to the noncontact type power feeder system, FIG. 5 is a chart showing distributions of magnetic flux density of this embodiment and the prior art system in the core widthwise direction, and FIG. 6 is a view for explaining a horizontally positional deviation of a mobile object.

Referring to FIG. 2, a power feeding portion 11 and a power receiving portion 12 in this embodiment have one and the same configuration, and a planar core 13 constituting them is composed of planar blocks 15, in combination, having a size and a shape which are the same as those of the planer blocks in the first embodiment. As shown in FIG. 3A, the power feeding portion 11 or the power receiving portion 12 is composed of 68, in total, of the planar blocks 15.

The planar cores 13 has not an E-like shape but such a shape that the E-type core 3 explained in the first embodiment is provided at its opposite ends, as viewed in the travel direction (a), with U-like sectional shape parts 131 for supporting the opposite ends of the windings as viewed in the longitudinal direction of the oval shape of windings 14. The windings 14 are formed in an oval shape, similar to the first embodiment. The planer core 13 has a rectangular recess 18 having long sides formed along the travel direction (a), for accommodating therein the windings 14, and protrusions 17 (the parts in which the planar blocks are superposed with one another in two stages) formed along the travel direction (a) on the outside and the inside of the recess 18. The windings 14 are accommodated in the recess 18, the longitudinal direction of the oval shape thereof being directed in the travel direction. With the addition of the above-mentioned U-like sectional shape parts 131, the planar core 13 has a support surface which supports thereon the windings 14 over the entire periphery of the latter.

As shown in FIGS. 3A to 3C, the power feeding portion 11 and the power receiving portion 12 are arranged in such a manner that their surfaces on the side in which the windings 14 are accommodated are opposed face-to-face to each other with a gap defined therebetween, being parallel with each other so as to constitute the noncontact type power feeder system. FIG. 4 shows magnetic flux lines applied to the power feeder system. After the mobile object which is not shown runs in, and when it comes to a stop at a position where the power receiving portion 12 is opposed face-to-face to the power feeding portion 11, an a.c. current (high frequency current in this case) is fed to a primary winding 14a in the power feeding portion 11, and accordingly, a magnetic flux with a main magnetic path extending through a primary core 13a, a secondary core 13b and the gap g as shown in FIG. 4 is produced.

The total magnetic flux is the sum of an effective magnetic flux m1 interlinking the secondary windings 14b and a leakage magnetic flux m2 which does not interlinks the secondary windings 14b. Since the magnetic flux interlinking the secondary windings 14b varies with time, an inductive electromotive force is produced in the secondary windings 14b through magnetic induction so that an a.c. current runs, and a power is transmitted to a load connected to the secondary winding 14b.

As shown in FIG. 4, the distance x-y (or x'-y') is set to be longer than the distance X-X' (which is orthogonal to the travel direction (a)) in the widthwise direction between the primary core 13a and the secondary core 13b. That is, by setting x-y (or x'-y')/x-x'≧1, the magnetic resistance of the magnetic path which produces a leakage magnetic flux can be increased. Thus, the leakage flux can be decreased, and accordingly, the magnetic coupling rate can be set to be lager, thereby it is possible to transmit a high power.

FIG. 5 shows a chart illustrating magnetic flux density distributions at the center of the gap g in the core widthwise direction in this embodiment and a conventional noncontact type power feeder system. The conventional noncontact power feeder system utilizes a conventional E-type core. The figure shows results of three-dimensional analysis of the magnetic flux density distributions in the widthwise direction of both systems under one and the same winding condition. In this embodiment, since the planar core 13 in each of the power feeding portion 11 and the power receiving portion 12 is additionally incorporated with the U-like sectional shape parts 131, the three-dimensional sectional area of the protrusions 17 located outside of the recess 18 in which the windings 14 are accommodated, is larger than that of the conventional E-type core. Thus, in comparison with the conventional system, the magnetic flux density outside of the windings 14 is small, and with the provision of the core having a U-like cross-sectional shape in the magnetic path which has been an air portion, the entire magnetic resistance can become less while the inductance becomes larger so that the magnetic flux density inside of the windings can become larger.

Thus, in this embodiment, since the inductance can be enhanced in comparison with the conventional E-type core, a higher power can be transmitted, and accordingly, the magnetic flux density around the power feeding portion 11 and the power receiving portion can be decreased, thereby it is possible to reduce affection by magnetic noise and inductive overheating therearound.

Further, according to this embodiment, due to the provision of the U-like sectional shape parts 131, a magnetic flux is likely to be produced even at end parts, and accordingly, the inductance is increased, thereby it is possible to transmit a high power.

FIG. 6 is a view for explaining a horizontally positional deviation of the mobile object. Referring to FIG. 6, when the mobile object which is not shown runs in the travel direction (a) so as to come to a stop above the power feeding portion 11, the power receiving portion 12 is not always positioned right above the power feeding portion 11 but possibly causes a horizontally positional deviation Δx therefrom in a certain case. However, even in this case, since this embodiment is composed of the large size planar core 13 having a rectangular shape with its long sides extending in the travel direction (a), and since the magnetic coupling rate can be enhanced as stated above, the gap g can be set to be relatively large, and accordingly, even though the horizontally positional deviation Δx is present, the inductance does not vary greatly, thereby it is possible to transmit a higher power. Similarly, even if the gap g is changed more or less, the inductance does not vary greatly, and accordingly, a higher power can be transmitted.

Thus, according to this embodiment, with the combination of several planer blocks 15, the planer core 13 having a large size can be easily formed at low costs. Even though the width of the core, orthogonal to the travel direction (a), is narrowed, the flexibility of design for transmission of a high power can be increased by adjusting the length of the core in the travel direction. Further, even though the gap g between the power feeding portion 11 and the power receiving portion 12 is set to be larger, the magnetic coupling rate can be increased. Further, even though a horizontally positional deviation Δx is present between the power feeding portion 11 and the power receiving portion 12, the inductance does not greatly vary, thereby it is possible to transmit a high power.

Embodiment 3

Figure 7:
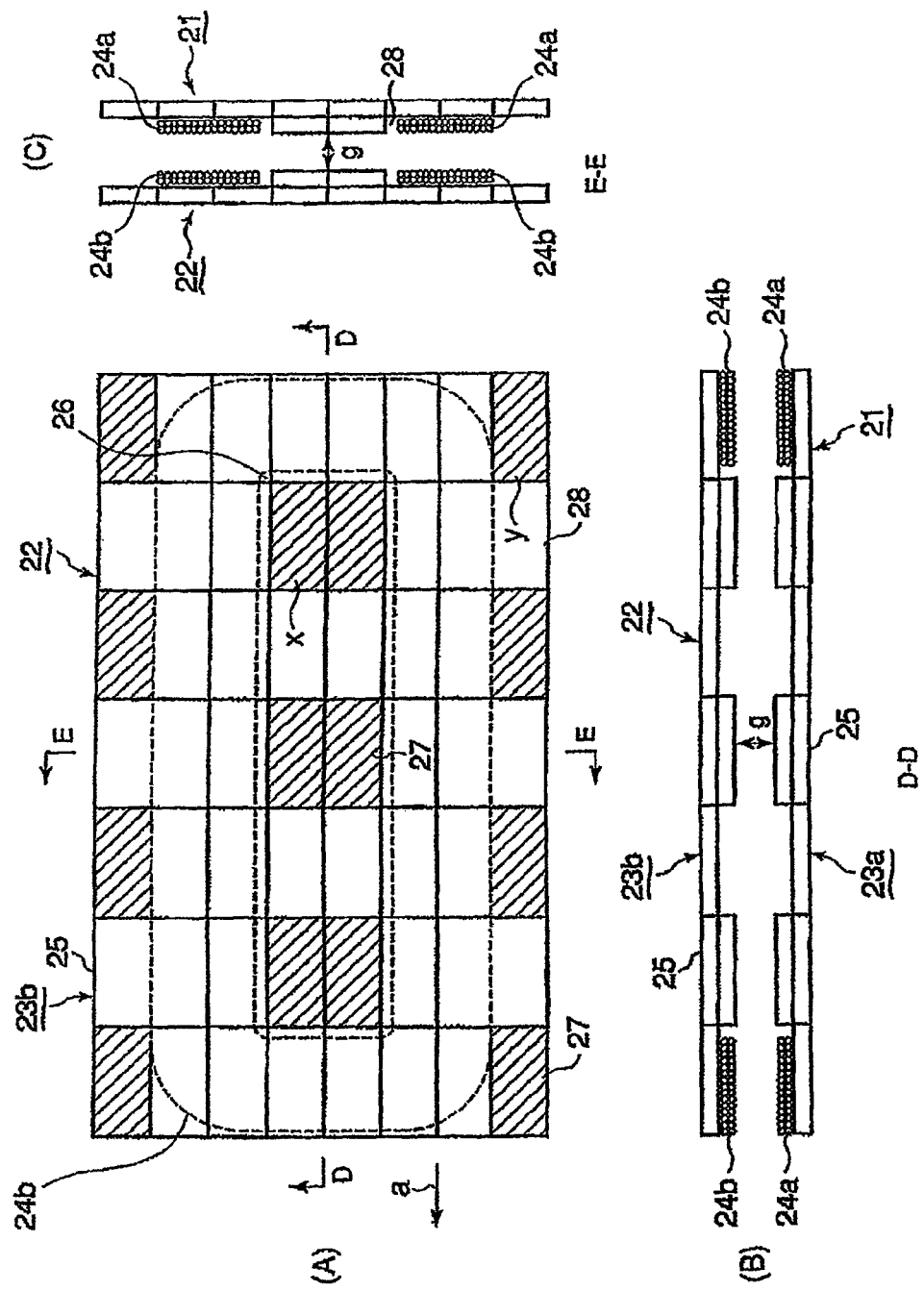
FIG. 7A is a plan view illustrating a noncontact type power feeder system in a third embodiment of the present invention.
FIG. 7B is a sectional view along line D-D in FIG. 7A.
FIG. 7C is a sectional view along line E-E in FIG. 7A.
Figure 8:
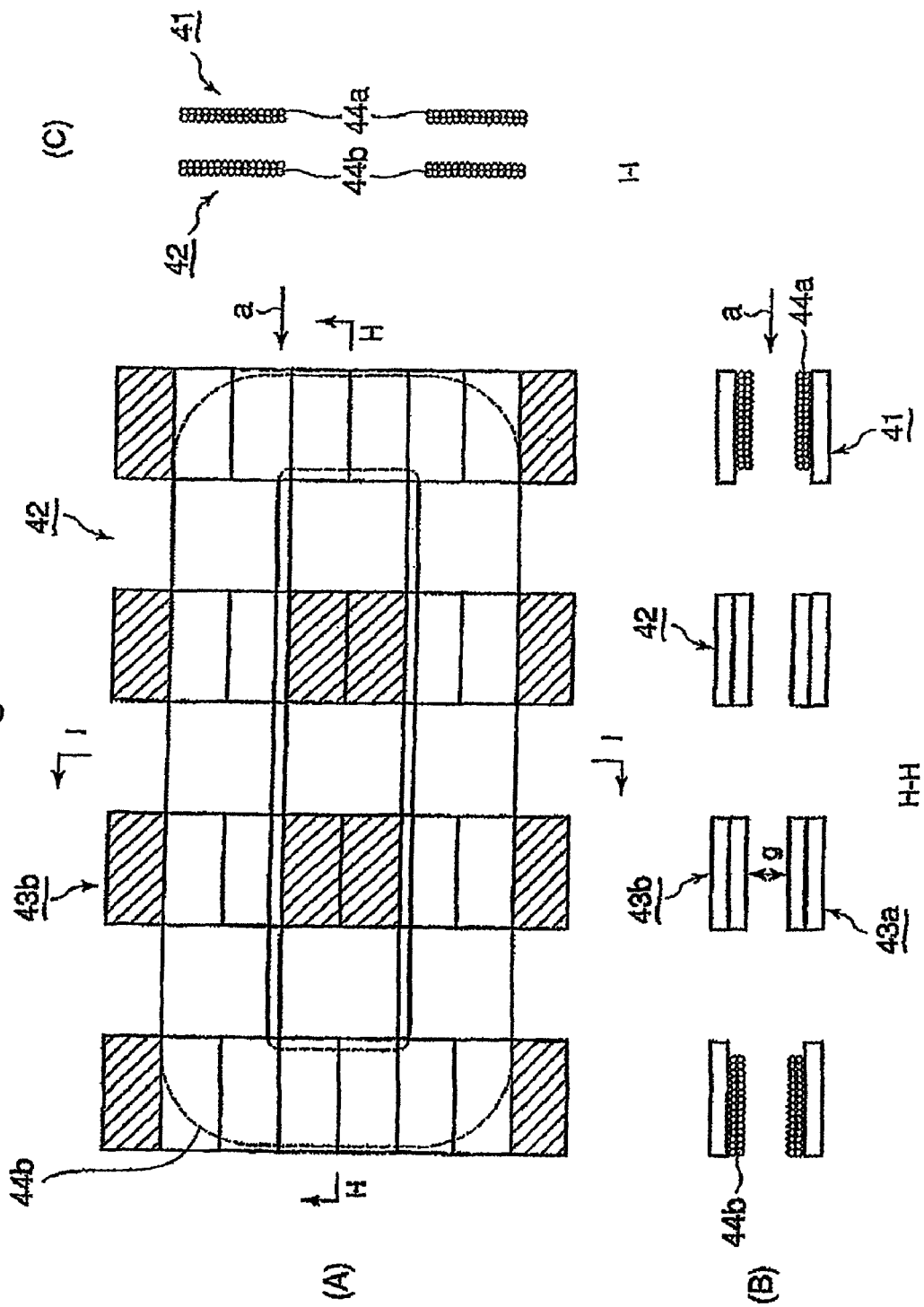
FIG. 8A is a plan view illustrating a noncontact type power feeder system in a variant form of the third embodiment.
FIG. 8B is a sectional view along line F-F in FIG. 8A.
FIG. 8C is a sectional view illustrating line G-G in FIG. 8A.
Figure 9:
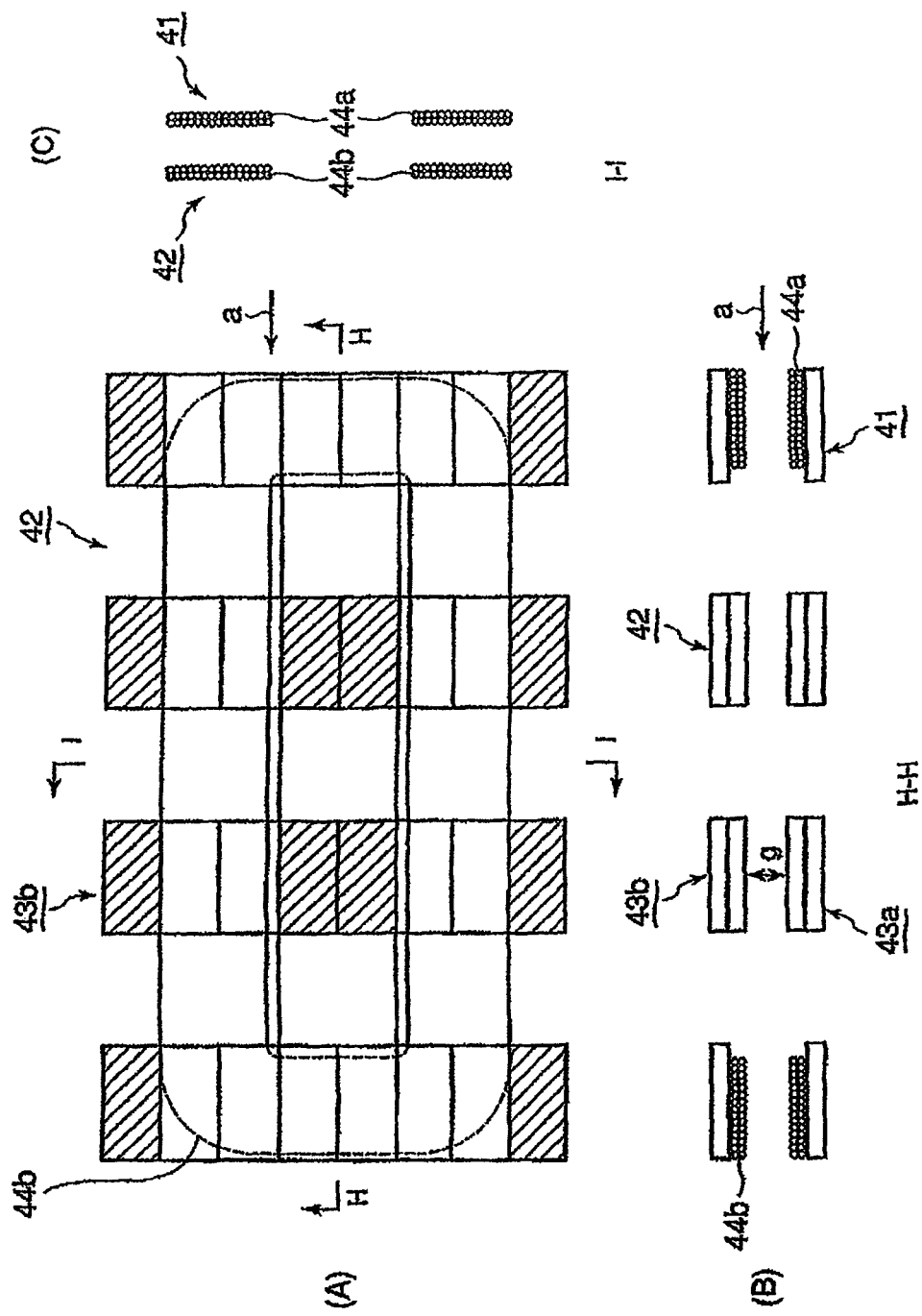
FIG. 9A is a plan view illustrating a noncontact type power feeder system in another variant form of the third embodiment.
FIG. 9B is a sectional view along line H-H in FIG. 9A.
FIG. 9C is a sectional view along line I-I in FIG. 9A.

Explanation will be hereinbelow made of a third embodiment of the present invention with reference to FIGS. 7A to 9C. FIGS. 7A to 7C show a non contact type power feeder system in the third embodiment of the present invention, in which FIG. 7A is a plan view, FIG. 7B is a sectional view along line D-D in FIG. 7A, and FIG. 7C is a sectional view along line E-E in FIG. 7A. The embodiment shown in FIGS. 7A to 7C is different from the second embodiment so that the long sides of the primary core 23a in the power feeding portion 21 and the secondary core 23b in the power receiving portion are set to be longer toward the travel direction (a) by a length corresponding to one planer block. The shaded parts in FIG. 7A exhibit protrusions 27 in which planar blocks 25 are superposed with each other in two stages. Instead of increasing the length in the travel direction (a), each of the protrusions 27 formed inside and outside of the primary winding 24a and the secondary winding 24b has such a configuration the planar blocks are thinned by one.

With the above-mentioned configuration, that is, the configuration which is longer in the travel direction (a) of the mobile object, a high power can be transmitted. Further, since the gap g can be accordingly set to be larger, the inductance is not appreciably changed even though the horizontally positional deviation $\Delta x$ is caused, thereby it is possible to transmit a high power. Further, by thinning the planar blocks 25 of the protrusions 27, the weight reduction and the cost reduction can be made, and accordingly, the fabrication can be simplified.

Further, since the cross-sectional areas of planes X and Y are larger than the recess 28, even though the magnetic flux density is increased by the thinned parts, overheating can be avoided, thereby it is possible to transmit a large power which is substantially equal to that of the second embodiment.

Explanation will be hereinbelow made of a variant form of the third embodiment with reference to FIGS. 8A to 8C in which FIG. 8A is a plan view illustrating a noncontact type power feeder system in the variant form of the third embodiment, FIG. 8B is a sectional view along F-F in FIG. 8A, and FIG. 8C is a sectional view along line G-G in FIG. 8A. Referring to FIGS. 8A to 8C, the configuration of the variant form is identical with that of the third embodiment, except that the number of superposing stages of the protrusions 37 inside of the primary winding 34a and the secondary winding 34b is reduced from 3 to 2. This variant form exhibit technical effects and advantages which are the same as those stated in the third embodiment.

Next, explanation will be hereinbelow made of another variant form of the third embodiment with reference to FIGS. 9A to 9C in which FIG. 9A is a plan view illustrating a noncontact type power feeding system in this variant form, FIG. 9B is a sectional view along line H-H in FIG. 9A and FIG. 9C is a sectional view along line I-I in FIG. 9A. Referring to FIGS. 9A to 9C, a primary core 43a in a power feeding portion 41 and a secondary core 43b in a power receiving portion 42 are formed of planer blocks by thinning one of them at every planar block interval, including the bottom portion thereof.

If it is required to transmit only a relatively low power, the weight reduction can be made by thinning the planar blocks as in this variant form.

In this embodiment, by setting the overall sizes of the surfaces of the power feeding portion 41 and the power receiving portion 42 which are opposed face-to-face to each other, to be equal to those in the embodiment shown in FIGS. 7A and 8A, it is possible to ensure a robustness of power transmission with respect to a variation in the gap g and the horizontal positional deviation $\Delta x$.

It is noted that any of the third embodiment and the two variant forms thereof incorporates an arrangement corresponding to the U-like sectional shape parts 131 in the second embodiment.

Embodiment 4

Figure 10:
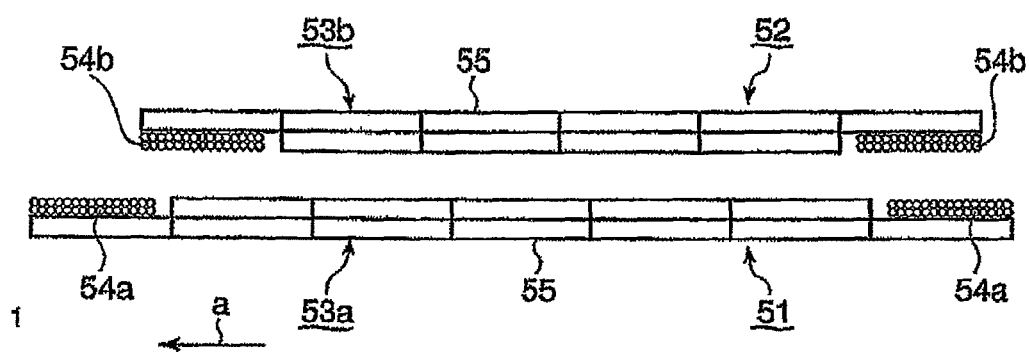
FIG. 10 is an elevation sectional view illustrating a noncontact type power feeder system in a fourth embodiment of the present invention.

Next, explanation will be hereinbelow made of a fourth embodiment of the present invention with reference to FIG. 10. FIG. 10 is an elevation sectional view illustrating a noncontact type power feeder system in the fourth embodiment.

Referring to FIG. 10, this embodiment incorporates a power feeding portion 51 and a power receiving portion 52, the feeding portion 51 being longer in the travel direction of the mobile object than the power receiving portion 52 by a length corresponding to one planer block which is additionally provided thereto. Thus, it is possible to enhance the robustness of power transmission with respect to a horizontal positional deviation upon stopping of the mobile object.

Further, the power receiving portion 52 which is mounted in the mobile object and which is required to be lightweight and compact, is shorter in the travel direction (a) than the power feeding portion, and accordingly, it is possible to enable the system to be lightweight and compact.

Figure 11:
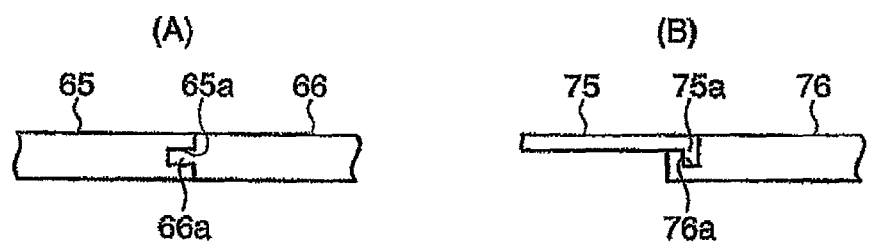
FIG. 11A and FIG. 11B are views for explaining a joint structure between planar blocks.

As a method of joining planar blocks to one another so as to constitute the core of the power feeding portion or the power receiving portion, there may be used a method in which they are jointed to one another by an adhesive or bolts. It is noted that the joint by screws cannot be used for the planar core or planar blocks made of ferrite which is a sintered material that is fragile. Further, in the case of a core made of a silicon steel sheet, the core may be secured to a base board by metal screws piercing through the core in a direction perpendicular to the superposed direction of the steel sheets. Further, as shown in FIGS. 11A and 11B, the planar blocks may have a fit-in structure at their ends. That is, referring to FIG. 11A, a recess 65a which is formed in the end part of a planar block 65 is closely fitted on a protrusion 66a which is formed at an end part of a planar block 66 adapted to abut against the recess 65a, so as to join both planar blocks 65, 66 to each other.

Meanwhile, referring to FIG. 11B, a protrusion 75a which formed at an end part of a planar block 75 is closely fitted in a recess 76a which is formed in an end part of a planar block 76 adapted to abut against the protrusion 75a, so as to join both planar blocks 75, 76 to each other.

Embodiment 5

Figure 12:
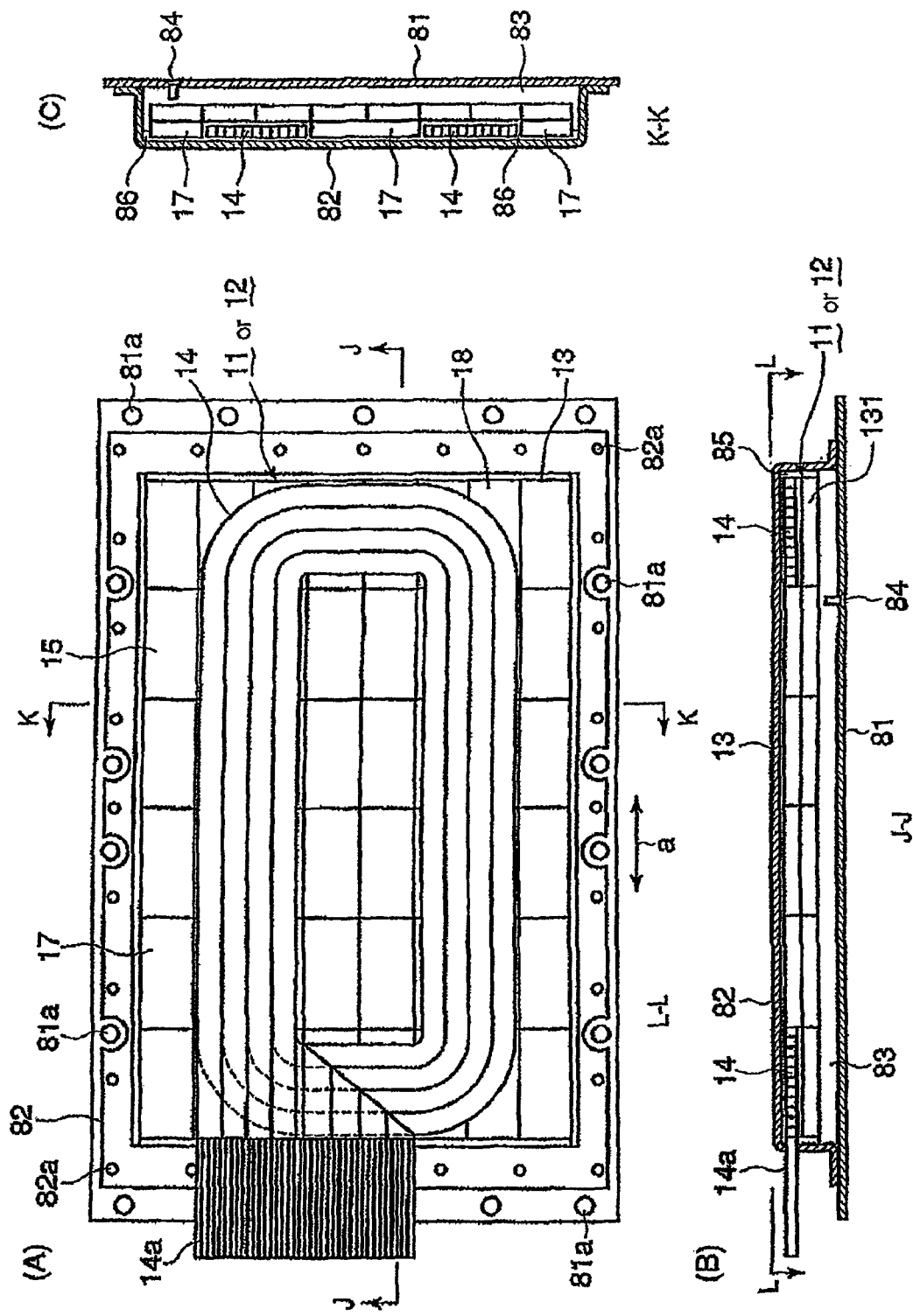
FIG. 12A is a plan sectional view (sectional view along line L-L in FIG. 12B) illustrating a noncontact type power feeder system in a fifth embodiment of the present invention.
FIG. 12B is a sectional view along line J-J in FIG. 12A.
FIG. 12C is a sectional view along line K-K in FIG. 12A.

Next, explanation will be made of an embodiment relating to a protecting apparatus for a noncontact type power feeder system according to the present invention, with reference to FIGS. 12A to 12C in which FIG. 12A is a sectional planar view illustrating this embodiment (sectional view along line L-L in FIG. 21B), FIG. 12B is a sectional view along line J-J in FIG. 12A, and FIG. 12C is a sectional view along line K-K in FIG. 12A. Referring to FIGS. 12A to 12C, a power feeding portion or a power receiving portion has a configuration the same as that in the second embodiment shown in FIG. 2. Thus, identical reference numerals are used to denote parts identical with those in the second embodiment.

An aluminum base board 81 is attached to a lower part of a mobile object by means of nonmagnetic SUS bolts inserted through bolt holes 81a in the case of the power receiving portion 12. However, in the case of the power feeding portion 11, the base board 84 is attached to the surface of a track way or the like for the mobile object by means of the nonmagnetic bolts. A protecting cover 82 which is, for example, made of polycarbonate and which defines therein an internal accommodation space is attached to the base board 81 by nonmagnetic bolts inserted through bolt holes 82a. Within the internal accommodation space of the protecting cover 82, a Bakelite insulation panel 83 is attached onto the base board 81 by nonmagnetic bolts 84. A planar core 13 constituting the power receiving portion 12 or the power feeding portion 11, is composed of several planar blocks 15 which are superposed one upon another, and which are laid horizontally, being joined to one another by an adhesive.

Windings 14 are accommodated in a recess 17 in the planar core 13, being covered thereover with an insulation sheet 86. The windings 14 are led out in a part 14a, outside of the protecting cover 82 through an aperture which is formed in a side wall of the protecting cover and which is not shown. It is noted that litz wires are used as windings constituting the windings 14. The part 14a and the windings 14 are covered with the protecting sheet 86 together with the windings 14. The planar core 13 and an insulation panel 83 are joined to each other by an adhesive. Further, a silicone group adhesive filler 85 is filled in a space between the planar core 13 and the rear surface of the protecting cover 82, and accordingly, the planar core 13 is firmly joined to the rear surface of the protecting cover 82. The arrow (a) indicates the travel direction of the mobile object or the like.

Explanation will be hereinbelow made of a method of manufacturing the protecting apparatus having the above-mentioned configuration. At first, the power receiving portion 12 or the power feeding portion 11 and the insulation panel 83 are stuck to each other by an adhesive in a layered formation, and are then accommodated in the internal accommodation space of the protecting cover 82. The adhesive filler 85 has been beforehand filled in the internal accommodation space of the protecting cover 82. The power receiving portion 12 or the power feeding portion 11 is firmly fixed in the internal accommodation space of the protecting cover 82 by means of the adhesive filler 85, and further, a gap between the rear surface of the protecting cover 82 and the power receiving portion 12 or the power receiving portion is filled with the adhesive filler 85.

Thereafter, the insulation panel 83 and the base board 81, and the protecting cover 82 and the base board 81 are coupled with each other by nonmagnetic bolts.

With the protecting apparatus in this embodiment, since the windings 14 are covered thereover with the insulation sheet 86 and since the power receiving portion 12 or the power feeding portion 11 is attached to the base board 81 through the intermediary of the insulation panel 83, no leakage of current running through the windings 14 occurs. Further, since the power receiving portion 12 or the power feeding portion 11 is covered with the protecting cover 82, it is isolated from an external environment including dust and rain water, and accordingly, no deterioration by the external environment will not be caused. Further, since the protecting cover 82 is made of polycarbonate which has a high shock resistance strength, the power receiving portion 12 or the power receiving portion 11 can be safely protected against external shocks.

Embodiment 6

Figure 13:
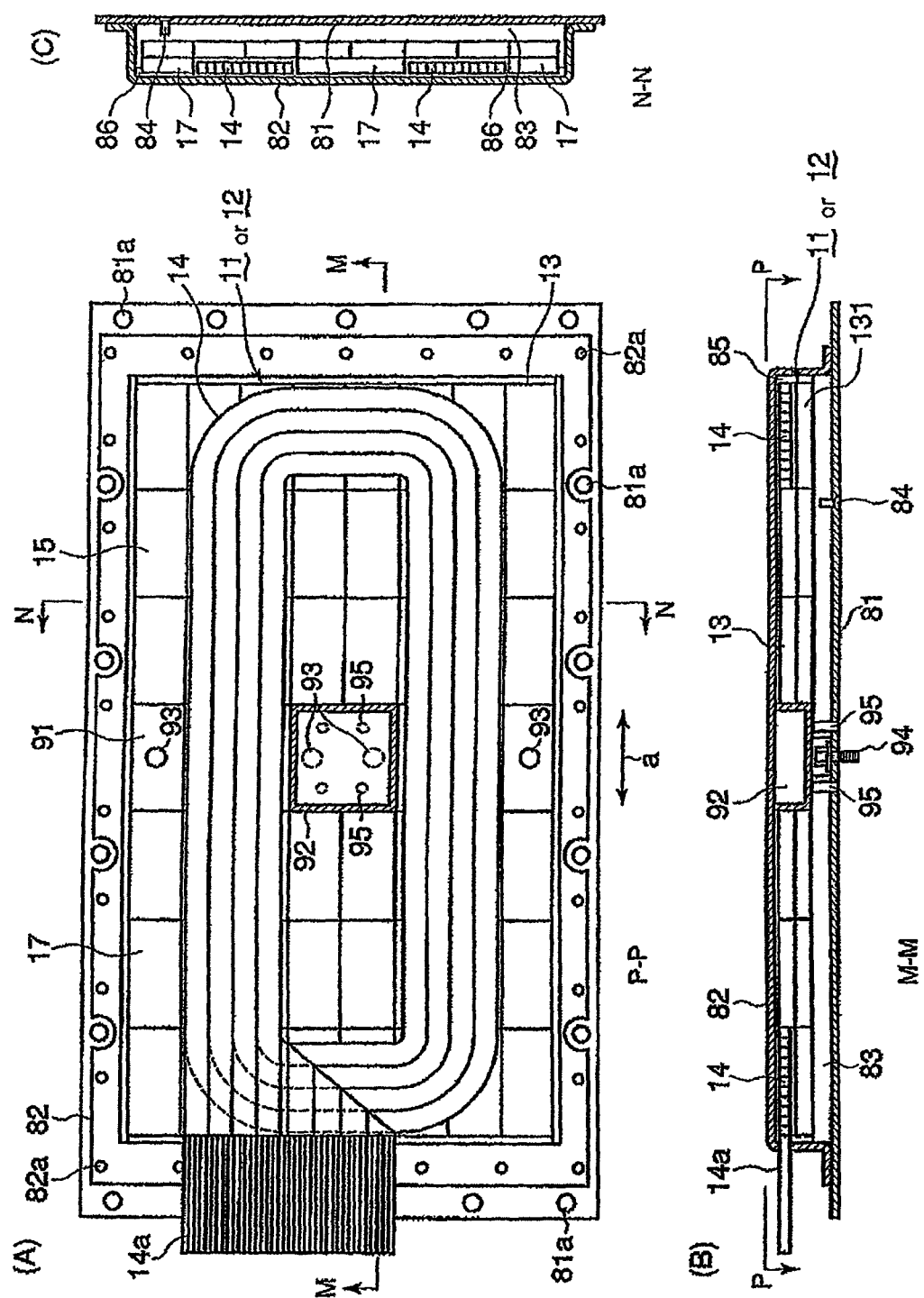
FIG. 13A is a plan sectional view (sectional view along line P-P in FIG. 13B) illustrating a sixth embodiment of the present invention.
FIG. 13B is a sectional view along line M-M in FIG. 13A.
FIG. 13C is a sectional view along line N-N in FIG. 13A.
Figure 14:
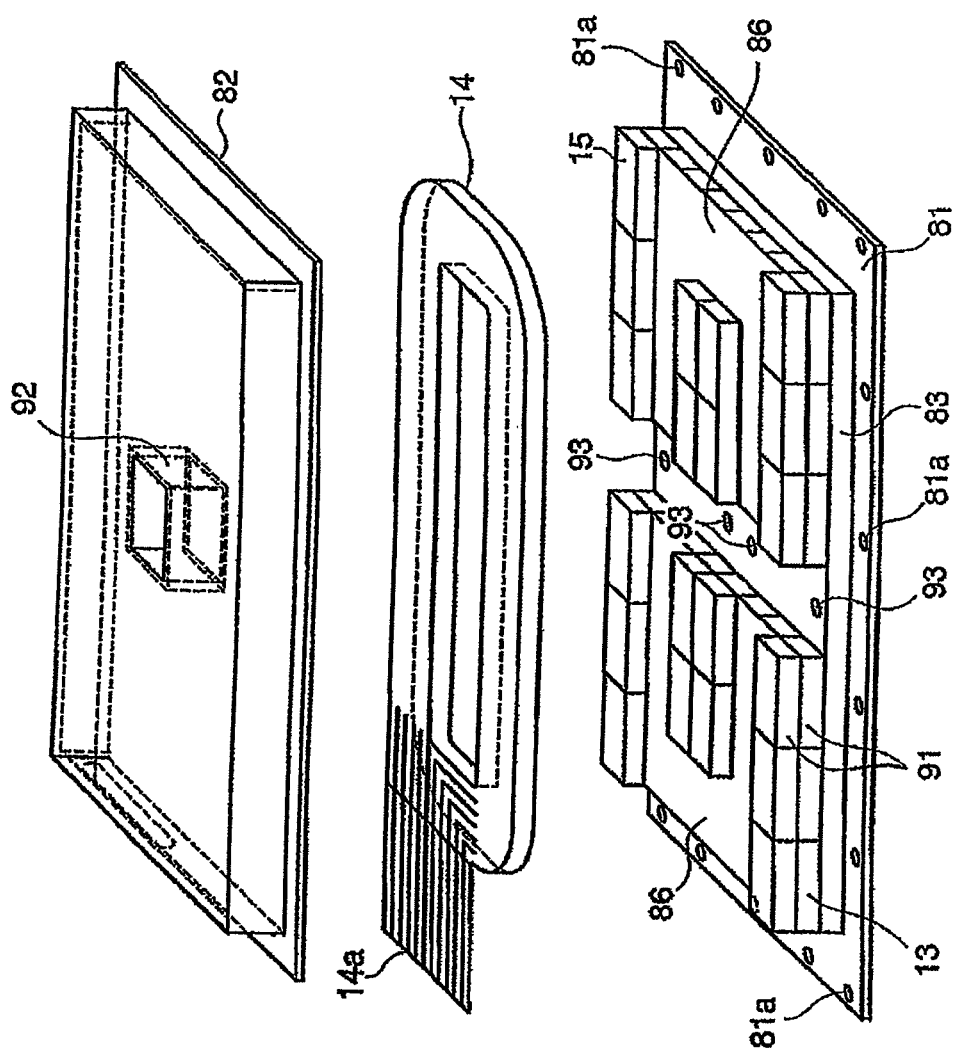
FIG. 14 is an exploded perspective view illustrating a protecting apparatus in the sixth embodiment of the present invention.

Next, explanation will be made of another embodiment relating to the protecting apparatus according to the present invention with reference to FIGS. 13A to 14 in which FIG. 13A is a plan sectional view illustrating this embodiment, FIG. 13B is as sectional view along line M-M in FIG. 13A, FIG. 13C is a sectional view along line N-N in FIG. 13A, and FIG. 14 is an exploded perspective view illustrating the protecting apparatus in this embodiment. In view of FIGS. 13A to 14, identical reference numerals are used to denote parts and equipments which have identical configurations with those in the fifth embodiment shown in FIGS. 12A to 12C so as to abbreviate the explanation thereof.

Reference to FIGS. 13A to 14, a planer core 13 constituting a power receiving portion 12 or the power feeding portion 11 in this embodiment is segmented at the center thereof, in a direction orthogonal to a travel direction (a) of a mobile object, into sections between which a gap part 91 having a length corresponding to the long sides 5a of a planar block 15 in the travel direction (a) of the mobile object is defined. A parallelepiped spacer 92 which is integrally incorporated with the protecting cover 82, having such a height that it can abut against the upper surface of the insulation panel 83, is provided in the center part of the gap part 91. Since the spacer 92 is supported at its lower surface on the insulation panel 83, the strength of the protecting cover 82 is enhanced up to a value which is about four times as high as that in the case of no spacer 92. Further, the gap part 91 is formed therein with holes 93 for attaching the protecting cover 82 to the mobile object or the surface of a track way for the mobile object with nonmagnetic bolts 94, and further, is formed therein with holes 95 for attaching the insulation panel 81 with nonmagnetic bolts 84.

In this embodiment, since the protecting cover 82 is made of polycarbonate having a high shock resistance strength, the power receiving portion 12 or the power feeding portion 11 accommodated in the internal accommodation space can be safely protected, and as well, since the protecting cover 82 is provided in its center part with the spacer 92 for supporting the center part of the protecting cover 82, the strength of the protecting cover 82 can be enhanced up to a value which is about four times as high as that in the case of no provision of the spacer 92.

According to the present invention, since the planar core constituting the power feeding portion or the power receiving portion is composed of several planar blocks each having a rectangular surface, in combination, the planar core which may have a desired shape and which may be compact can be manufactured at low costs, thereby it is possible to simply manufacture a large-size planar core. The power feeding portion or the power receiving portion formed of the above-mentioned planer core has a thin shape, and accordingly, it is suitable to be attached to the lower part of the mobile element which defines a narrow space or to be embedded in the surface of a track way for the mobile object.

Further, since the planar blocks are arranged so as to extend the long sides of the rectangular shape of the planar blocks in the travel direction of the mobile object, and since the windings are arranged so as to extend the longitudinal direction of the oval shape thereof along the travel direction of the mobile object, a planar core which is longer in the travel direction can be formed, thereby it is possible to transmit a high power. Meanwhile, since the width of the planar core can be narrowed in the direction orthogonal to the travel direction, the flexibility of dimensional design can be enhanced.

Further, according to the present invention, since a large core can be arranged in the travel direction of the mobile object, the space between the power feeding portion and the power receiving portion can be set to a relatively large value. Thus, even though a large positional deviation is caused when the mobile object comes to a stop, the inductance is not so greatly changed, thereby it is possible to transmit a high power.

Further, in the protecting apparatus according to the present invention, the power feeding portion or the power receiving portion is covered thereover with a protecting cover having a high strength, it is possible to protect the power feeding portion or the power receiving portion against a large external force and as well to protect the power feeding portion or the power receiving portion against dust, rain water and the like, thereby it is possible to prevent the power feeding portion or the power receiving portion from being deteriorated.

The invention claimed is:

1. A noncontact type power feeder system comprising a power feeding portion provided along a track way for a mobile object, and a power receiving portion provided in the mobile object, the power feeding portion being opposed face-to-face to the power receiving portion so as to feed a power thereto characterized in that:

each of the power feeding portion and the power receiving portion is formed of windings formed in an oval shape, and a magnetic planar core formed in its surface with a recess for accommodating therein the windings;

the planar core is formed of an assembly of planer blocks each having a rectangular surface, the assembly of planar blocks comprises thin wall parts in which several planar blocks are laid in one and the same plane with their long sides being made into contact with one another, and thick wall parts in which several planer blocks are superposed one upon another, the recess of the planar core is defined by the thick wall parts in which planar blocks are superposed on the surface of the planar core outside and inside of the oval shape part of the windings, the longitudinal direction of the oval shape of the windings and the long sides of the planar blocks are directed in a travel direction of a mobile object when the power feeding portion and the power receiving portion are opposed face-to-face to each other.

2. A noncontact type power feeder system as set forth in claim 1, characterized in that the planar core is provided at its opposite ends with U-like sectional shape parts for supporting opposite ends of the windings in the longitudinal direction of the oval shape of the windings, and accordingly, the windings are supported by the planer core along its entire periphery of the windings.

3. A noncontact type power feeder system as set forth in claim 1, characterized in that the recess of the planer core has an opening width which is equal to or larger than the gap between the power feeding portion and the power receiving portion.

4. A noncontact type power feeder system as set forth in claim 1, characterized in that the length of the power feeding portion in the travel direction is set to be longer than the length of the power receiving portion in the travel direction when the power feeding portion and the power receiving portion are opposed face-to-face to each other.

5. A noncontact type power feeder system as set forth in claim 1, wherein said planer bocks are combined so as to form the surface of the planar core in a rectangular shape.

6. A noncontact type power feeder system as set forth in claim 2, characterized in that the thick wall parts and the thin wall parts are arranged alternately along the travel direction of the mobile objects, and the thick wall parts and the thick wall parts are arranged with point symmetry with respect to the center point of the planar core.

7. A noncontact type power feeder system as set forth in claim 2, characterized in that the planer core is divided into sections along the travel direction of the mobile object, and air gap parts are defined between the divided sections of the planar core while the planar core is composed of the thick wall parts, except the recess, and the thick wall parts and the air gap parts are arranged with point symmetry with respect to the center point of the planar core.

8. A protecting apparatus for a noncontact type power feeder system, for accommodating therein and protecting the power feeding portion or the power receiving portion having a configuration as stated in claim 1, characterized in that a protecting cover having an internal accommodation space is attached to a base board mounted to a mobile object or around a track way for the mobile object, and the power feeding portion or the power receiving portion is accommodated in the internal accommodation space with a planar insulation member being interposed between itself and the base board.

9. A protecting apparatus for a noncontact type power feeder system for a mobile object as set forth in claim 8, characterized in that an air gap part is defined in the center part of the planar core, and a spacer for filling a space between the planar insulation member and the protecting cover is provided in the air gap part.

* * * * *